(12) United States Patent
Hays et al.

(10) Patent No.: US 7,919,665 B2
(45) Date of Patent: Apr. 5, 2011

(54) MERCURY REMOVAL FROM HYDROCARBONS

(75) Inventors: John M. Hays, Bartlesville, OK (US); Erin E. Tullos, Bartlesville, OK (US); Joseph B. Cross, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 272 days.

(21) Appl. No.: 12/372,128

(22) Filed: Feb. 17, 2009

(65) Prior Publication Data
US 2010/0210889 A1 Aug. 19, 2010

(51) Int. Cl.
*C07C 7/12* (2006.01)

(52) U.S. Cl. ........ 585/820; 585/849; 585/852; 585/853; 208/13; 208/251 R; 208/253; 208/295; 208/296; 208/297; 208/299; 208/302; 208/307

(58) Field of Classification Search ............ 208/13, 208/251 R, 253, 295, 296, 297, 299, 302, 208/307; 585/820, 849, 852, 853
See application file for complete search history.

(56) References Cited

U.S. PATENT DOCUMENTS

| 4,946,582 | A |  | 8/1990 | Torihata et al. |  |
| 4,986,898 | A |  | 1/1991 | Torihata et al. |  |
| 5,080,799 | A |  | 1/1992 | Yan |  |
| 5,202,301 | A | * | 4/1993 | McNamara | 502/417 |
| 5,336,835 | A |  | 8/1994 | McNamara |  |
| 6,033,556 | A |  | 3/2000 | Didillon et al. |  |
| 6,268,543 | B1 |  | 7/2001 | Sakai et al. |  |
| 6,383,981 | B1 |  | 5/2002 | Blankenship et al. |  |

FOREIGN PATENT DOCUMENTS

WO  WO 98/47823 A1  10/1998

OTHER PUBLICATIONS

PCT/US2010/024349 International Search Report (Form PCT/ISA/220) dated Jul. 16, 2010.

* cited by examiner

*Primary Examiner* — Prem C Singh

(57) ABSTRACT

A process is disclosed for removing mercury from a liquid hydrocarbon stream by contacting the mercury-containing liquid hydrocarbon stream with ferrous halide at moderate temperatures and without preheating the liquid hydrocarbon stream, or subjecting the liquid hydrocarbon stream to a heat treating step, immediately prior to contact with the ferrous halide particles.

12 Claims, No Drawings

MERCURY REMOVAL FROM HYDROCARBONS

The present invention relates to a process for the removal of mercury from a hydrocarbon stream. In another aspect, this invention relates to a process for the removal of mercury from a hydrocarbon stream through contact with ferrous halide particles.

Since the presence of mercury in hydrocarbons can cause problems with refinery processing units, as well as health and environmental issues, there is an incentive to remove mercury from hydrocarbon streams, such as crude oil.

Therefore, development of an improved process for effectively removing mercury from hydrocarbon streams would be a significant contribution to the art.

BRIEF SUMMARY OF THE INVENTION

In accordance with the present invention, a process is provided including the following:
a) contacting, in a contact zone, a liquid hydrocarbon stream comprising hydrocarbons and mercury with ferrous halide particles wherein the liquid hydrocarbon stream is not preheated, or subjected to a heat treating step, immediately prior to contact with the ferrous halide particles; and
b) removing a treated liquid hydrocarbon stream from the contact zone; wherein the treated liquid hydrocarbon stream contains less mercury than the liquid hydrocarbon stream.

DETAILED DESCRIPTION OF THE INVENTION

The liquid hydrocarbon stream of the present invention comprises, consists of, or consists essentially of hydrocarbons and mercury, and can be any hydrocarbon stream containing mercury. More particularly, the hydrocarbon stream is a crude oil stream removed from a crude oil well, or a fraction thereof.

The mercury can be selected from the group consisting of Hg(0) (elemental mercury), a Hg(I) compound, a Hg(II) compound, and combinations thereof. Examples of Hg(I) compounds include $Hg_2Cl_2$ and $Hg_2S$; and examples of Hg(II) compounds include $HgCl_2$, HgO, HgS, HgSe, and HgTe.

The liquid hydrocarbon stream typically comprises at least about 0.1 ppb mercury, or at least about 1 ppb mercury, or at least about 100 ppb mercury.

The liquid hydrocarbon stream is contacted, in a contact zone, with ferrous halide particles, wherein the liquid hydrocarbon stream is not preheated, or subjected to a heat treating step, immediately prior to contact with the ferrous halide particles. The ferrous halide can be ferrous chloride, ferrous fluoride, ferrous bromide, ferrous iodide, or combinations thereof. Preferably, the ferrous halide is ferrous chloride ($FeCl_2$).

A treated liquid hydrocarbon stream is removed from the contact zone, and the treated liquid hydrocarbon stream contains less mercury than the liquid hydrocarbon stream. Preferably, the treated liquid hydrocarbon stream contains less than 80%, more preferably less than 50%, and even more preferably less than 10% of the mercury contained in the liquid hydrocarbon stream.

The liquid hydrocarbon stream is contacted with the ferrous halide particles at a temperature in the range of from about 0° C. to about 90° C., or at a temperature in the range of from about 15° C. to about 70° C., or at a temperature in the range of from about 15° C. to about 45° C.

The ferrous halide particles can be contained in a fixed bed in the contact zone. The liquid hydrocarbon stream is then contacted with the ferrous halide particles by passing the liquid hydrocarbon stream through the fixed bed, with subsequent removal of the treated liquid hydrocarbon stream from the contact zone.

As another alternative, the ferrous halide particles and the liquid hydrocarbon stream can be mixed to form a slurry in the contact zone, with subsequent settling or filtering of the ferrous halide particles from the slurry to form a hydrocarbon phase and either a settled particle phase or a filtered particle phase. At least a portion of the hydrocarbon phase is then removed from the contact zone as the treated liquid hydrocarbon stream.

The liquid hydrocarbon stream is contacted with the ferrous halide particles in the contact zone at a liquid hourly space velocity in the range of from about 0.1 to about 10, or from about 0.1 to about 5, or from about 0.1 to about 2.

The following example is provided to further illustrate this invention and is not to be considered as unduly limiting the scope of this invention.

Example

Run 1

A 3.01 g quantity of decane spiked with around 1786 ppbw elemental Hg was added to a bottle containing 0.3424 g of $FeCl_2$ and shaken for around one hour. The temperature of the mixture was around 23° C. Mercury reduction results are shown in the Table below.

Run 2

A 3.052 g quantity of decane spiked with around 1645 ppbw elemental Hg was added to a bottle containing 0.2961 g of $FeCl_2$ and shaken for around one hour. The temperature of the mixture was around 70° C. Mercury reduction results are shown in the Table below.

Run 3

A 1.987 g quantity of a crude oil sample containing around 667 ppbw Hg was added to a bottle containing 1.9171 g of $FeCl_2$ and shaken for around one hour. The temperature of the mixture was around 23° C. Mercury reduction results are shown in the Table below.

TABLE

| | Hydrocarbon Sample Type | Temp. (° C.) | Initial Hg level in the Hydrocarbon Sample (ppbw) | Hg level in Hydrocarbon Sample after bottle-shake test (ppbw) |
|---|---|---|---|---|
| RUN 1 | Decane | 23 | 1786 | 53 |
| RUN 2 | Decane | 70 | 1645 | 24 |
| RUN 3 | Crude Oil | 23 | 667 | 29 |

These results demonstrate that ferrous chloride particles are very effective in removing mercury from hydrocarbons at moderate temperatures.

While this invention has been described in detail for the purpose of illustration, it should not be construed as limited thereby but intended to cover all changes and modifications within the spirit and scope thereof.

That which is claimed:

1. A process comprising:
   a) contacting, in a contact zone and at room temperature, a liquid hydrocarbon stream comprising hydrocarbons and mercury with unsupported ferrous halide particles wherein said liquid hydrocarbon stream is not preheated, or subjected to a heat treating step, immediately prior to contact with said ferrous halide particles; and
   b) removing a treated liquid hydrocarbon stream from said contact zone; wherein said treated liquid hydrocarbon stream contains at least 95 wt % less mercury than said liquid hydrocarbon stream.

2. A process in accordance with claim 1 wherein said ferrous halide is ferrous chloride.

3. A process in accordance with claim 1 wherein said liquid hydrocarbon stream is a crude oil stream removed from a crude oil well.

4. A process in accordance with claim 1 wherein said liquid hydrocarbon stream comprises hydrocarbons and elemental mercury.

5. A process in accordance with claim 1 wherein said liquid hydrocarbon stream comprises at least about 0.1 ppb mercury.

6. A process in accordance with claim 1 wherein said liquid hydrocarbon stream comprises at least about 1 ppb mercury.

7. A process in accordance with claim 1 wherein said liquid hydrocarbon stream comprises at least about 100 ppb mercury.

8. A process in accordance with claim 1 wherein said ferrous halide particles are contained in a fixed bed in said contact zone, and said liquid hydrocarbon stream is contacted with said ferrous halide particles by passing said liquid hydrocarbon stream through said fixed bed.

9. A process in accordance with claim 1 wherein said ferrous halide particles and said liquid hydrocarbon stream are mixed to form a slurry in said contact zone, with subsequent separation by a method selected from the group consisting of 1) settling of said ferrous halide particles from said slurry to form a hydrocarbon phase and a settled particle phase, and 2) filtering of said ferrous halide particles from said slurry to form a hydrocarbon phase and a filtered particle phase; and with removal of a portion of said hydrocarbon phase from said contact zone as said treated liquid hydrocarbon stream.

10. A process in accordance with claim 1 wherein said liquid hydrocarbon stream is contacted with said ferrous halide particles in said contact zone at a liquid hourly space velocity in the range of from about 0.1 to about 10.

11. A process in accordance with claim 1 wherein said liquid hydrocarbon stream is contacted with said ferrous halide particles in said contact zone at a liquid hourly space velocity in the range of from about 0.1 to about 5.

12. A process in accordance with claim 1 wherein said liquid hydrocarbon stream is contacted with said ferrous halide particles in said contact zone at a liquid hourly space velocity in the range of from about 0.1 to about 2.

* * * * *